United States Patent
Eronen et al.

(10) Patent No.: US 10,560,752 B2
(45) Date of Patent: Feb. 11, 2020

(54) APPARATUS AND ASSOCIATED METHODS

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Veli-Matti Kolmonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/308,923

(22) PCT Filed: Jun. 12, 2017

(86) PCT No.: PCT/FI2017/050432
§ 371 (c)(1),
(2) Date: Dec. 11, 2018

(87) PCT Pub. No.: WO2018/002418
PCT Pub. Date: Jan. 4, 2018

(65) Prior Publication Data
US 2019/0149886 A1 May 16, 2019

(30) Foreign Application Priority Data
Jun. 27, 2016 (EP) .................................... 16176504

(51) Int. Cl.
*H04N 21/472* (2011.01)
*G02B 27/00* (2006.01)
(Continued)

(52) U.S. Cl.
CPC ....... *H04N 21/47217* (2013.01); *A63F 13/26* (2014.09); *G02B 27/0093* (2013.01);
(Continued)

(58) Field of Classification Search
None
See application file for complete search history.

(56) References Cited

U.S. PATENT DOCUMENTS 9,432,629 B2 * 8/2016 Olsen, Jr. ............ H04N 7/17318
2006/0028542 A1 * 2/2006 Rondinelli ......... H04N 5/23238
348/36
(Continued)

FOREIGN PATENT DOCUMENTS

EP 2204992 A1 7/2010
EP 3236336 A1 10/2017
(Continued)

OTHER PUBLICATIONS

"What Do You Want to Track?", Quuppa, Retrieved on Dec. 5, 2018, Webpage available at : http://quuppa.com/.
(Continued)

*Primary Examiner* — Jason K Lin
(74) *Attorney, Agent, or Firm* — Harrington & Smith (57) ABSTRACT

An apparatus configured to: in respect of virtual reality content comprising video imagery and spatial audio wherein the perceived direction to an audio event related to a visual event in the video imagery corresponds to a visual location of said visual event as presented in the virtual reality space; based on a change in the viewing direction of the virtual reality view by the user from a first viewing direction to a second viewing direction, and wherein said second viewing direction corresponds to, within a direction threshold, a direction of a particular audio event; providing for display of missed event content thereby allowing a user to see a missed visual event for which they heard the associated audio event and reacted thereto by changing the viewing direction.

20 Claims, 3 Drawing Sheets

800: based on a change in the viewing direction of the virtual reality view by the user from a first viewing direction to a second viewing direction, and wherein said second viewing direction corresponds to, within a direction threshold, a direction of a particular audio event;

801: providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event thereby allowing a user to see a missed visual event for which they heard the associated audio event and reacted thereto by changing the viewing direction.

(51) Int. Cl.
*G06F 1/16* (2006.01)
*G06F 3/01* (2006.01)
*H04S 7/00* (2006.01)
*A63F 13/26* (2014.01)
*G02B 27/01* (2006.01)
*G06T 19/00* (2011.01)
*H04N 21/443* (2011.01)
*A63F 13/497* (2014.01)
*G06F 3/16* (2006.01)
*A63F 13/5375* (2014.01)
*A63F 13/54* (2014.01)

(52) U.S. Cl.
CPC ........... *G02B 27/017* (2013.01); *G06F 1/163* (2013.01); *G06F 3/012* (2013.01); *G06F 3/013* (2013.01); *G06F 3/017* (2013.01); *G06T 19/006* (2013.01); *H04N 21/4438* (2013.01); *H04S 7/305* (2013.01); *A63F 13/497* (2014.09); *A63F 13/5375* (2014.09); *A63F 13/54* (2014.09); *A63F 2300/66* (2013.01); *G02B 2027/0178* (2013.01); *G06F 3/167* (2013.01); *H04S 2420/01* (2013.01)

(56) References Cited

U.S. PATENT DOCUMENTS

| | | |
|---|---|---|
| 2013/0141421 A1 | 6/2013 | Mount et al. |
| 2013/0194164 A1 | 8/2013 | Sugden et al. |
| 2014/0375683 A1 | 12/2014 | Salter et al. |
| 2015/0036999 A1 | 2/2015 | Batur et al. |
| 2015/0319400 A1* | 11/2015 | Golyshko ............... G11B 27/28 386/230 |
| 2016/0255406 A1* | 9/2016 | Soh ..................... H04N 21/4263 725/32 |
| 2017/0026577 A1* | 1/2017 | You .......................... G06F 3/167 |
| 2017/0111674 A1* | 4/2017 | Meredith ............ H04N 21/2187 |
| 2017/0316806 A1* | 11/2017 | Warren ................ G11B 27/031 |
| 2017/0374120 A1* | 12/2017 | Vishnia ................. H04L 65/601 |
| 2018/0124374 A1* | 5/2018 | Smith .................... G06F 3/013 |
| 2018/0302604 A1* | 10/2018 | Zhou .................... H04L 65/607 |

FOREIGN PATENT DOCUMENTS

| | | | | |
|---|---|---|---|---|
| JP | 2008219286 A | * | 9/2008 | ............... H04N 5/91 |
| JP | 2013250838 A | * | 12/2013 | ............... G06F 3/16 |
| WO | 2014/087558 A1 | | 6/2014 | |
| WO | 2015/193806 A1 | | 12/2015 | |
| WO | WO-2015193806 A1 | * | 12/2015 | ............... A61B 5/16 |

OTHER PUBLICATIONS

Extended European Search Report received for corresponding European Patent Application No. 16176504.5, dated Dec. 8, 2016, 8 pages.

International Search Report and Written Opinion received for corresponding Patent Cooperation Treaty Application No. PCT/FI2017/050432, dated Sep. 1, 2017, 13 pages.

* cited by examiner

| | Direction | Start time | End time |
|---|---|---|---|
| Audio event 1 | 135° | 30s | 35s |
| Audio event 2 | 85° | 90s | 99s |

800 — based on a change in the viewing direction of the virtual reality view by the user from a first viewing direction to a second viewing direction, and wherein said second viewing direction corresponds to, within a direction threshold, a direction of a particular audio event;

801 — providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event thereby allowing a user to see a missed visual event for which they heard the associated audio event and reacted thereto by changing the viewing direction.

APPARATUS AND ASSOCIATED METHODS

RELATED APPLICATION

This application was originally filed as Patent Cooperation Treaty Application No. PCT/FI2017/050432 filed Jun. 12, 2017 which claims priority benefit to EP Patent Application No. 16176504.5, filed Jun. 27, 2016.

TECHNICAL FIELD

The present disclosure relates to the field of virtual reality and, in particular, to the display of missed event content from virtual reality content. In particular, it relates to the display of missed event content from virtual reality content, the temporal start point of which is based on an audio event. Associated methods, computer programs and apparatus is also disclosed. Certain disclosed aspects/examples relate to portable electronic devices.

BACKGROUND

Virtual reality may use a headset, such as glasses or goggles, or one or more displays that surround a user to provide the user with an immersive virtual experience. A virtual reality apparatus may present multimedia virtual reality content representative of a virtual reality space to a user to simulate the user being present within the virtual reality space. The virtual reality space may be provided by a panoramic video, such as a video having a wide or 360° field of view (which may include above and/or below a horizontally oriented field of view). Spatial audio comprising sound that appears to originate at a particular location may also be provided as part of the consumption of virtual reality. A consequence of the video imagery that forms the virtual reality space being larger than what a user is able to view at any one time is that the user may hear an event but not see it.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
  based on a change in the viewing direction of the virtual reality view by the user from a first viewing direction to a second viewing direction, and wherein said second viewing direction corresponds to, within a direction threshold, a direction of a particular audio event, a start of which occurring prior to the change in the viewing direction;
  provide for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

The missed event content may thereby allowing a user to see a missed visual event for which they heard the associated audio event and may have reacted thereto by changing the viewing direction. Spatial audio, otherwise known as three dimensional audio, presents audio to a user (consumer) of virtual reality such that the user perceives audio events that make up the total audio environment as coming from particular directions and therefore the user may hear an audio event for which the corresponding visual event is outside their current virtual reality view. If the user reacts to view the visual event associated with the audio event they just heard by moving their head, for example, and thereby moving the virtual reality view, by the time they are looking in the perceived direction of the audio event, they may have missed some or all of the corresponding video imagery (the visual event) associated with the audio event. Accordingly, the apparatus may "rewind" the virtual reality content such that they can view the missed event content and thereby view the visual event content associated with the audio event they heard. For example, if the user is looking forward (i.e. in the first viewing direction) watching a particular group of football players and then hears a sound (an audio event) perceived as originating behind them (i.e. out of their current view and in the second viewing direction), such a player shouting "Pass to me" they may wish to see why the player is shouting. Thus, they turn their head to change the viewing direction from the first viewing direction to the second viewing direction. It will be appreciated that time has moved on since the user decided to look in the second viewing direction and they have missed seeing the visual content associated with the player shouting "Pass to me". However, the missed event content may allow the user to see the visual event they did not see that was associated with audio event they did hear. Accordingly, the apparatus provides for display of at least visual imagery and optionally the accompanying audio from a time point in the virtual reality content that is based on the audio event so that the user can see the visual event they missed.

In one or more embodiments, the visual event related to the particular audio event was not visible in the virtual reality view when directed in the first viewing direction. In one or more embodiments, in the virtual reality view when directed in the first viewing direction, the user's gaze did not lie upon said visual event when the corresponding particular audio event occurred.

In one or more embodiments, the temporal start point of the missed event content is based on the time at which the particular audio event is deemed to have begun based on one or more of:

analysis of the particular audio event relative to any other audio presented;

analysis of the particular audio event; and predetermined audio event data that defines at least the timing of audio events in the virtual reality content.

In one or more other examples, the time at which the particular audio event is deemed to have begun may be determined by any appropriate method.

In one or more embodiments, the provision of the missed event content is further based on the rate of change in viewing direction between the first viewing direction and the second viewing direction exceeding a direction-change threshold. This may be advantageous as the direction-change threshold may be used to distinguish between a user is casually looking around the virtual reality space at the video imagery presented therein and a user who has reacted to a sound they heard, i.e. the audio event. The direction-change threshold be greater than 0.05, 0.06, 0.07, 0.08, 0.09 or more degrees/millisecond.

In one or more embodiments, the provision of the missed event content is further based on one or more of the volume or frequency content of the particular audio event relative to an audio threshold (which may be an absolute audio threshold or a relative threshold relative to any other audio presented to the user). This may be advantageous as the volume or frequency content can be used to identify audio events that a user may have reacted to and accordingly provide appropriate missed event content. The change of the VR view direction may provide for identification of one or more possible audio events using the audio event threshold from which the particular audio event is identified based on the second viewing direction corresponding to, within the direction threshold, the direction of the particular audio event.

In one or more embodiments, determination of the particular audio event is based on one or more of:

a) predetermined audio event data comprising the direction to one or more audio events occurring in the virtual reality content and a correlation between the second viewing direction, within the direction threshold, and the direction of one of the one or more audio events;

b) audio analysis of the spatial audio in response to the change in viewing direction to identify the particular audio event the user looks towards in the second viewing direction.

In one or more examples, the audio analysis is based on one or more of volume and frequency content of the spatial audio relative to an audio threshold.

In one or more embodiments, the predetermined audio event data is based on one or more of:

audio analysis which may include volume-based, frequency-based and/or voice-recognition-based analysis;

manually provided audio event data;

sensor data, said sensor data obtained from sensors associated with objects that are captured in the VR content;

video analysis, which may include lip reading analysis and/or action identification algorithms that look for rapidly changing localised video imagery above a threshold.

Thus, in one or more examples, the apparatus may have predetermined knowledge of audio events and may be configured to match the second viewing direction of the VR view to one of the known audio events in order to provide the missed event content. In one or more examples, the apparatus may not have knowledge of the audio events and may analyse the spatial audio for loud portions (more generally volume characteristics) or portions containing particular frequencies (more generally frequency characteristics) that may have prompted the user to change the viewing direction. The analysis of the spatial audio may be constrained to the directions of the second viewing direction, within the direction threshold. In response to an audio event being identified by the analysis, missed event content may be provided to show the visual event linked to the identified audio event. The temporal start point of the missed event content may be based on the audio analysis or the audio event data. For example, the start point may be based on when a loud portion of spatial audio occurred or a portion containing particular audio frequencies. It will be appreciated that the temporal start point may start a predetermined time period prior to the start of the audio event, which may help the user to understand the cause of the audio event.

Thus, in one or more examples, one or more audio events may be determined on-the-fly or may be predetermined (and audio event data provided with the virtual reality content) and the apparatus may be configured to determine a user's interest in the particular audio event based on the second VR viewing direction corresponding to one of the possible audio events. Alternatively or in addition, the apparatus may be configured such that the change in the viewing direction by the user provides for an identification process to identify the particular audio event they may have reacted to. Thus, in response to the change in viewing direction, the apparatus may provide for analysis of the spatial audio within the direction threshold of the second direction to identify an audio event as the particular audio event, which the user may have reacted to. Appropriate missed event content may then be provided.

In one or more embodiments, the provision of display of the missed event content includes providing for temporarily pausing of the virtual reality content and display of the missed event content in the virtual reality view.

In one or more embodiments, in response to the change in viewing direction towards the direction of the particular audio event, provide for display of the virtual reality content in reverse with respect to time such that the virtual reality content appears to the user as being re-wound to a time point at which the missed event content begins.

In one or more embodiments, the display of the virtual reality content in reverse with respect to time may begin once the user has settled on the second viewing direction. In one or more embodiments the display of the virtual reality content in reverse with respect to time may begin as the user initiates the change in viewing direction based on a prediction of the second viewing direction on which they may settle. For example, audio event data may indicate an audio event in the general direction the user changes the VR view and therefore a prediction that the user is turning towards said audio event is possible.

In one or more embodiments, the missed event content comprises one or more of;

i) missed event video imagery extracted from the video imagery of the virtual reality content;

ii) missed event still imagery extracted from the video imagery of the virtual reality content;

iii) missed event virtual reality content extracted from the video imagery of the virtual reality content wherein at least an initial viewing direction of the missed event virtual reality content is aligned with the direction of the particular audio event;

iv) missed event virtual reality content extracted from the video imagery of the virtual reality content wherein the missed event virtual reality content has a spatial extent less than the spatial extent of the virtual reality content and is focussed in the direction of the particular audio event.

In one or more embodiments, the missed event content is provided for display as picture in picture in the virtual reality view with the virtual reality content. In this example, the virtual reality content may be temporally uninterrupted thereby continuing the display of the virtual reality content while simultaneously showing the temporally-prior missed visual event.

In one or more embodiments, upon completion of the display of the missed event content the display of the virtual reality content is resumed from a time point corresponding to the time of the change in viewing direction from the first viewing direction to the second viewing direction. The resumption of display of the virtual reality content may be with a current viewing direction of the virtual reality view, which may be, substantially, the second viewing direction.

In one or more embodiments, upon completion of the display of the missed event content the virtual reality content is provided for display, at least temporarily, at a playback speed greater than real-time. This may provide for the play back of the virtual reality content to catch up to where it would have been had the missed event content not been provided for display. This may be particularly useful if the virtual reality content comprises live virtual reality content, rather than pre-recorded virtual reality content.

In one or more embodiments, the direction threshold hold may be less than 90°, less than 70°, less than 45°, or less than 30°. In one or more embodiments, the direction threshold may be advantageous as the user may not be able to precisely look towards the source of a sound they may have only briefly heard and therefore the direction threshold provides a tolerance for identifying the particular audio event.

In a second aspect there is provided a method, the method comprising;
  in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
  based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;
  providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

In a third aspect there is provided a computer readable medium comprising computer program code stored thereon, the computer readable medium and computer program code being configured to, when run on at least one processor, perform the method of.
  in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
  based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;
  providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

In a further aspect there is provided an apparatus, the apparatus comprising means configured to, in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
  based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;
  provide for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

The present disclosure includes one or more corresponding aspects, examples or features in isolation or in various combinations whether or not specifically stated (including claimed) in that combination or in isolation. Corresponding means and corresponding functional units (e.g., function enabler, video imagery extractor, video imagery compiler, viewing direction measurer, viewing direction modifier, video player, direction sensor) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Virtual reality (VR) may use a headset, such as glasses or goggles, or one or more displays that surround a user to provide a user with an immersive virtual experience. A virtual reality apparatus may present multimedia virtual reality content representative of a virtual reality space to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (which may include above and/or below a horizontally oriented field of view). The virtual reality space thus provides a virtual 3-dimensional environment in which the video imagery of the VR content is provided for display. A user may be provided with a spatial subset of the virtual reality space as their VR view, i.e. a view port to view the video imagery of the VR space. The virtual reality apparatus may provide for user interaction with the virtual reality space displayed. The virtual reality content provided to the user may comprise live or recorded images of the real world, captured by a virtual reality content capture device such as a panoramic video capture device or virtual reality content capture device, for example. One example of a virtual reality content capture device is a Nokia OZO camera. The virtual reality space may provide a 360° or more field of view and may provide for panning/rotating around said field of view based on movement of the VR user's head or eyes. The virtual reality view of a virtual reality space may be provided to said user by virtual reality apparatus via displays in the headset. The virtual reality space may appear to the user of the VR apparatus as a three dimensional space created from images of the virtual reality content. Thus, the VR content may comprise images taken in multiple viewing directions that can be displayed and arranged together to form a (uninterrupted, continuous) wrap around field of view.

Virtual reality content may, by its nature, be immersive and may thereby comprise a large amount of data. The virtual reality content may comprise video imagery (i.e. moving images) that have a large spatial extent, such as to surround the user. The virtual reality view provided to the user may only cover an area of the video imagery smaller than the total area and the user may need to move the virtual reality view around to appreciate the whole spatial extent of the virtual reality space that the video imagery covers. It will be appreciated that with VR video imagery that progresses over time, it is not possible for the user to see all spatial parts of the video imagery at all times and therefore events are inherently missed.

VR content may be presented with spatial audio, otherwise known as three dimensional audio or directional audio, which presents audio to a user (consumer) of virtual reality such that the user perceives elements of the audio as originating from a particular direction. Thus, the audio presented to a user consuming VR content may comprise ambient or non-directional audio such as background music which is perceived as not coming from a particular direction and direction audio which is perceived by the user as originating from a particular direction. It will be appreciated that events in the virtual reality content generate accompanying audio, such as characters speaking, cars revving, hockey pucks being struck. Thus, the voice of a character speaking who visually appears to the left of the user's virtual reality view may be presented as directional audio originating from that left-hand side. Herein an audio event may comprise a portion, at least with respect to time, of directional audio that is linked to a visual event occurring in the virtual reality content. Thus, an audio event of a spoken monologue may be linked to a visual event of a character speaking the monologue in the visual imagery of the VR content. An audio event of a "thwack" sound may be linked to a visual event of a hockey puck being struck by a hockey player because the striking of the hockey puck generated that sound. It will be appreciated that the spatial audio presented to the user may include numerous directional sounds, i.e. audio events, perceived as originating from a variety of directions.

The virtual reality view, as mentioned above, comprises only a portion of the total spatial extent of the video imagery of the VR content, but the audio presented to the user may include directional audio perceived as originating in a direction outside the spatial extent of the virtual reality view, similar to real-life. Thus, a user may hear directional audio but they do not witness the linked visual event because they were looking in the wrong direction when the audio event occurred.

While a user may react quickly to hearing an audio event and change the direction of the VR view to look in the perceived direction of the audio event, they may have missed the linked visual event in the video imagery. This may be confusing for a user and may make the VR content more difficult for them to understand or may require them to watch it several times with different viewing directions to fully appreciate the events that occurred.

Figure 1:
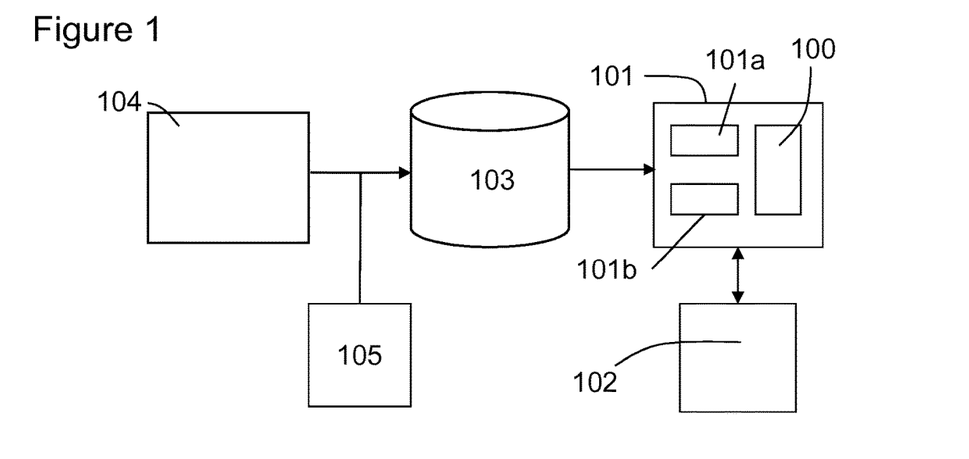
FIG. 1 illustrates an example embodiment of the apparatus along with a virtual reality apparatus.

FIG. 1 shows an apparatus 100 configured to provide for display of missed event content comprising at least visual imagery extracted from video imagery of the virtual reality content that shows the visual event corresponding to the particular audio event they heard. Thus, a user may be able to see the visual event for which they heard the associated audio event.

The apparatus 100 may be part of a virtual reality device 101 configured to present the virtual reality content to a user. The virtual reality device 101 may present a VR view of a VR space to a user via a VR display 102, which may comprise a headset. The VR view provided to the user on the VR display 102 may be based on the orientation of the VR display, such that a user can look around the VR space by moving their head. It will be appreciated that other types of display and other means to "look around" the virtual reality space may be provided. In some examples, the apparatus 100 is functionally provided by a computer, the virtual reality device 101 or a computer server, each of which may comprise a memory 101a and at least one processor 101b, although in other examples the apparatus may be an electronic device, such as a computer, mobile telephone or other apparatus as listed hereinafter in communication with the VR device 101. The virtual reality device 101, in this example, is configured to receive virtual reality content from a virtual reality content store 103 where virtual reality content is stored (which may include being stored transiently or temporarily). Thus, the virtual reality content may be live content and the store 103 may be a memory or buffer of a display or onward transmission path. The apparatus 100 may receive indications of where the user is looking in the virtual reality space and one or more of the location of audio events, the audio itself and audio analysis information for the audio presented to the user. The audio event data may be predetermined or may be generated by the apparatus 100 or a different apparatus 105.

The VR content may be provided by a virtual reality content capture device 104. The different apparatus 105 may be configured to create audio event data and the audio event data may be stored with the VR content in the VR content store 103. In one or more other examples, the different apparatus 105 is not provided and the occurrence and direction of audio events may be determined by the apparatus 100 or an apparatus associated therewith.

In one or more examples, the audio event data may be manually provided based on human analysis of the virtual reality content during capture or in post-production and thus the different apparatus 105 may represent data entry of audio event data. In one or more examples, the audio event data may be automatically generated based on computer based audio analysis of the spatial audio, which may be provided during production of the VR content or after production. In one or more examples the audio event data is generated on-the-fly either as part of preparing the virtual reality content for display to the user, such as by the apparatus 100 and/or VR device 101, or during the display of the virtual reality content to the user. It will be appreciated that while the content capture device 104 and different apparatus 105 are shown connected to the VR content store, this is only for appreciation of the overall system and the apparatus 100 may operate with recorded VR content with or without the different apparatus 105.

In this embodiment the apparatus 100 (or other electronic device) mentioned above may have only one processor 101b and one memory 101a but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as from content store 103 and the VR device 101 in accordance with instructions stored in the form of computer program code in the memory. The output signalling generated by such operations of the processor is provided onwards to further components, such as the VR apparatus 101 for display of the missed event content.

The memory (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor and memory are all electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

Figures 2, 3:
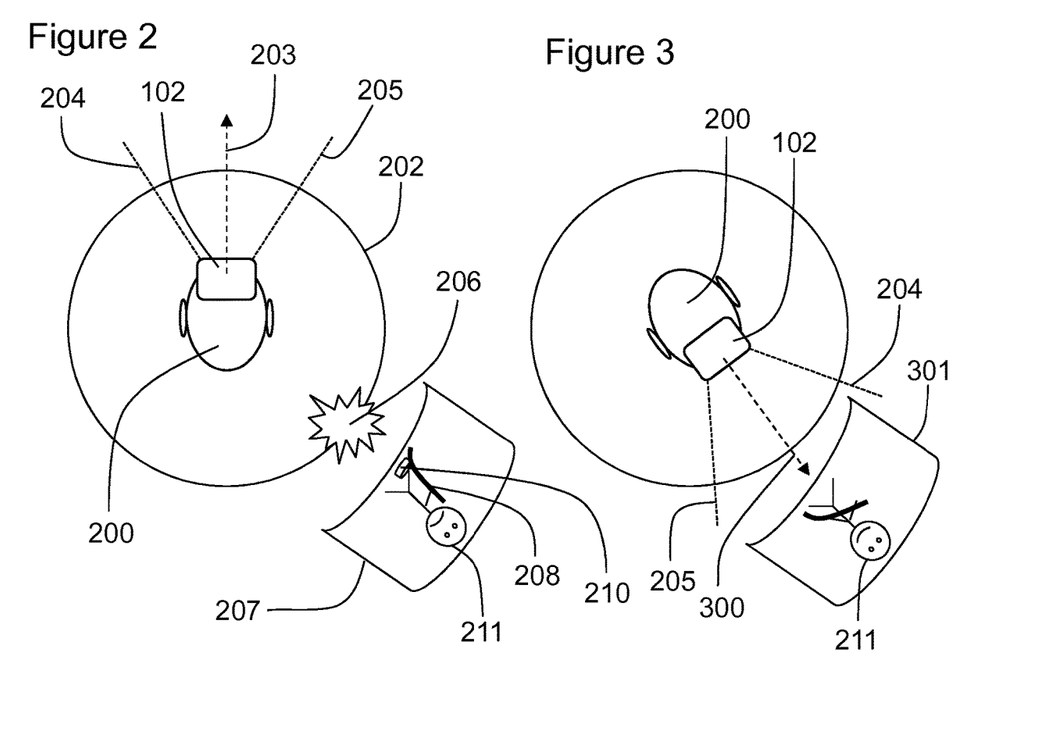
FIG. 2 illustrates an example plan view showing the user looking in a first viewing direction in a virtual reality space and the location of an occurrence of an audio event.
FIG. 3 illustrates an example plan view showing the user looking in a second viewing direction in the virtual reality space having reacted to the audio event but having missed the associated visual event.

FIG. 2 shows example plan view showing a user 200 wearing the VR display 102 which, in this example, comprises a headset. The user 200 is watching VR content 202 which is shown, diagrammatically, as a ring surrounding the user, similar to how the video imagery of the VR content is displayed in multiple viewing directions to wrap around the user in a virtual reality space. In FIG. 2 the user 200 is looking in a first viewing direction 203 in the virtual reality space at a portion of the video imagery of the VR content defined by field of view lines 204, 205.

FIG. 2 also shows the occurrence of an audio event 206, which comprises spatial audio and therefore is perceived by the user 200 as originating from a particular direction. The audio event 206 is associated with a visual event 207. It will be appreciated that the user 200 does not see the visual event 207 because they are looking in the first direction and the visual event 207 occurs in the second direction and is shown in FIG. 2 for understanding. The audio event comprises the sound of a hockey stick 208 hitting a puck 210. Thus, the visual event 207 associated with the audio event 206 comprises the visual imagery of the source of the sound that comprises the audio event 206. In this example, the sound source of the audio event 206 is the player 211 hitting the puck 210 with his hockey stick 208.

FIG. 3 shows the user 200 possibly having reacted to the audio event 206 and turned their head to look in the perceived direction of the audio event 206, i.e. the second direction 300. Thus, the viewing direction of the virtual reality view has been changed from the first direction 203 to the second direction 300. While in this example this change in viewing direction of the VR view is effected by the turning of the user's 200 head, in other examples control of the VR view may be achieved in other ways.

As shown in FIG. 3, by the time the user 200 has reacted to the audio event 206, and changed the VR view they have missed at least part of the visual event 207 that is related to the audio event 206. In this example, as the audio event 206 was relatively short, the VR view 301 presented to the user 200 is now temporally later than the visual event 207 and, as it happens, is of the player 211 looking pleased with themselves after striking the puck 210. The user 200 has therefore missed the visual event 207 that was related to the audio event 206 they heard.

In this example, the apparatus 100 is configured to, based on the change in the viewing direction of the virtual reality view by the user 200 from the first viewing direction 203 to the second viewing direction 300, and wherein said second viewing direction 300 corresponds to, within a direction threshold, a direction 300 of the particular audio event 206 heard by the user, provide for display of missed event content, as will be described in relation to FIG. 4. Thus, depending on the temporal length of the audio event 206 and how quickly the user 200 reacts thereto, the second direction 300 may be the direction of the ongoing audio event 206 or an audio event 206 that occurred in the recent or immediate past. In determination of the audio event 206 that the user 200 reacted to, a time window extending from the current time into the past by a recent-time-threshold may be used. The recent-time-threshold may be set to include any audio events that occurred in up to the last 1, 2, 3, 4, 5, 6, 7, 8, 9, 10 or more seconds when determining the particular audio event the user 200 has turned towards. Further, it will be appreciated that the user may not precisely look in the direction of the audio event 206 that the user heard. Accordingly the second direction 300 may not exactly align with the direction of the audio event 206. The direction threshold may be used to provide a tolerance between the second direction 300 and the direction of the audio event 206. The direction threshold may be configured to be less than 5°, less than 10°, less than 15°, less than 20°, less than 30°, less than 40° or more. The direction threshold may be have different values in the horizontal and vertical planes, for example to be similar to human hearing direction perception accuracy.

The action of the user changing the viewing direction from the first viewing direction 203 to the second viewing direction 300 may prompt the apparatus 100 to provide for display of missed event content. The second viewing direction being in alignment with a recent audio event may prompt the apparatus 100 to identify this recent audio event as the particular audio event the user looked towards and to provide for display of missed event content 400. The change of viewing direction may prompt the apparatus to identify the particular audio event that the user reacted to and subsequently provide for display of missed event content. The apparatus may provide for display of the missed event content in response to user confirmation that they wish to view said missed event content following the apparatus providing for prompting of the user that missed event content is available. Accordingly, the apparatus 100 may be configured to identify the particular audio event the user reacted to by change of the viewing direction and then may provide for presentation to the user of a prompt or option to view the missed event content 400. The alignment of the second viewing direction with a direction of a recent audio event may occur frequently and therefore the display of or prompting for the display of missed event content may be bothersome. Thus, the apparatus 100 may be configured to, when determining whether to provide for display or prompt for display of missed event content, base the decision on the rate of change in viewing direction between the first viewing direction 203 and the second viewing direction 300 exceeding a direction-change threshold. This may enable the apparatus to distinguish between a user 200 who is casually looking around the virtual reality space at the video imagery presented therein and a user 200 who has reacted to a particular audio event 206. The direction-change threshold (the direction change being towards the direction of the audio event 206, for example) may be greater than 0.05, 0.06, 0.07, 0.08, 0.09 or more degrees/millisecond. The rate of change information may be provided by the VR apparatus 101 and/or VR display 102. If the rate of change is relatively quick it may be deduced that the user 200 reacted to the audio event and therefore provide for display or prompt for display of missed event content 400. If the rate of change is relatively slow, it may be deduced that the user did not react to the audio event and the missed event content is not provided for display. Alternatively or in addition, a prompt asking the user whether they wish to view the missed event content may not be provided for display.

Figure 4:
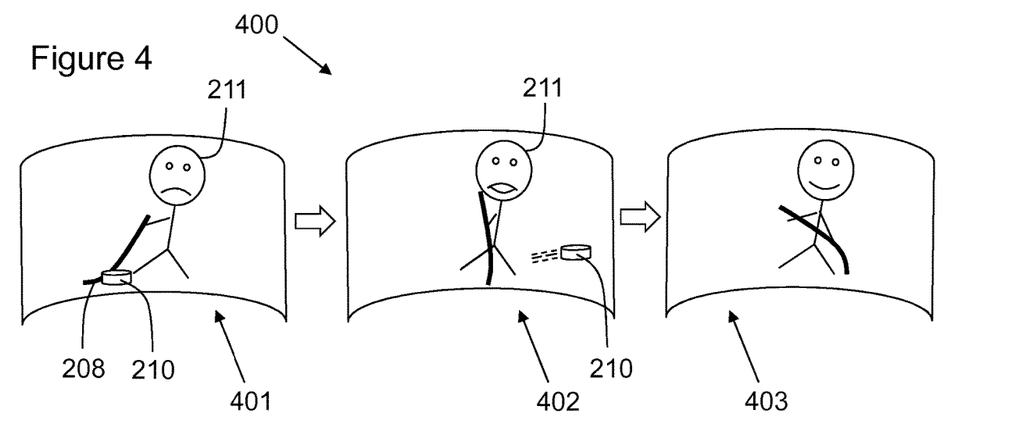
FIG. 4 illustrates an example missed event content.

FIG. 4 shows three screenshots of an example missed event content 400. It will be appreciated that the three exemplary frames 401, 402, 403 shown in FIG. 4 are representative of a continuous video that comprises the missed event content. The missed event content 400, in this example, comprises a video comprising the visual imagery of the visual event 207 that is associated with the audio event the user 200 heard. In other examples, the missed event content may be a series of still images, flat video (i.e. without the ability to look around a virtual reality space at different portions of the video) or virtual reality content. The missed event content, in this example, comprises at least visual imagery extracted from the video imagery of the virtual reality content that shows the visual event 207 corresponding to the particular audio event 206. Prior to display of the missed event content 400 or as part of the missed event content 400, the apparatus 100 may provide for rewinding of the virtual reality content. Thus, the apparatus may provide for display to the user of the virtual reality content played in reverse to demonstrate that the content they are about to witness occurred in the past. Thus, to the user, the virtual reality content may appear to "rewind" to the time point at which the missed event content starts.

A temporal start point of the missed event content 400 is thus prior to a temporal point in the virtual reality content when the change in the viewing direction 203, 300 occurred. Further, the temporal point from which the missed event content starts is based on the particular audio event 206. In one or more examples, the temporal start point of the missed event content may be the time point at which the start of the audio event 206 occurred. Thus, the temporal start point may be momentarily prior to the sound of the audio event 206 being made. In one or more examples, the temporal start point of the missed event content with respect to the virtual reality content is a predetermined time period prior to the start of the audio event 206, which may help the user to understand the cause of the audio event. Thus, rather than the missed event content starting as the audio event 206 occurs, it may start a few seconds prior to the audio event 206. The predetermined time period may be up to 1, 2, 3, 4, 5, 6, 7, 8, 9, 10, 15, 20, 30, 60 seconds such that the temporal start point of the missed event content begins the predetermined time period prior to the start of the audio event 206.

In the example of FIG. 4, a first frame 401 of the missed event content video (i.e. visual imagery and accompanying audio) begins a few second prior to the occurrence of the audio event 206. The first frame 401 shows the player 211 ready to strike the puck 210. The second frame 402 shows the player 211 striking the puck 210 and the puck being propelled towards the right. The third frame 403 shows the end of the missed event content 400 and comprises the visual imagery at the approximate time the user looked in the second direction 300, referenced as 301 in FIG. 3.

Thus, the missed event content comprises at least the visual imagery that includes the visual event 207. The missed event content 400 may also include at least visual imagery a predetermined time prior to the occurrence of the audio event 206. The missed event content 400 may include at least visual imagery after the audio event 206 and at least up to the time point at which the user looked in the second direction 300.

Thus, the user, having heard the directional audio of an audio event 206 from the second direction 300, may be automatically provided with missed event content that at least includes the visual imagery of the VR content that is associated with the audio event (which may be the visual imagery that occurs in the second direction, depending on how accurately the user is able to pinpoint the direction of the audio event). The missed event content thereby allows a user to see a missed visual event 207 for which they heard the associated audio event 206 and reacted thereto by changing the viewing direction 203, 300.

The display of the missed event content may be provided in response to one or more of:
 i) automatically following the change of viewing direction and the identification of an audio event;
 ii) a user request that they wish to view missed event content;
 iii) user confirmation that they wish to view missed event content in response to a prompt provided to the user that missed event content is available based on their change of viewing direction.

The prompt may be a visual graphic provided for display in the VR view provided by the VR display 102. The prompt may be an audible prompt or a haptic prompt. The user request or user confirmation may be one or more of a sight command, a voice command, and a command via a user interface such as a mobile phone or other electronic device in communication with the apparatus.

Figure 5:
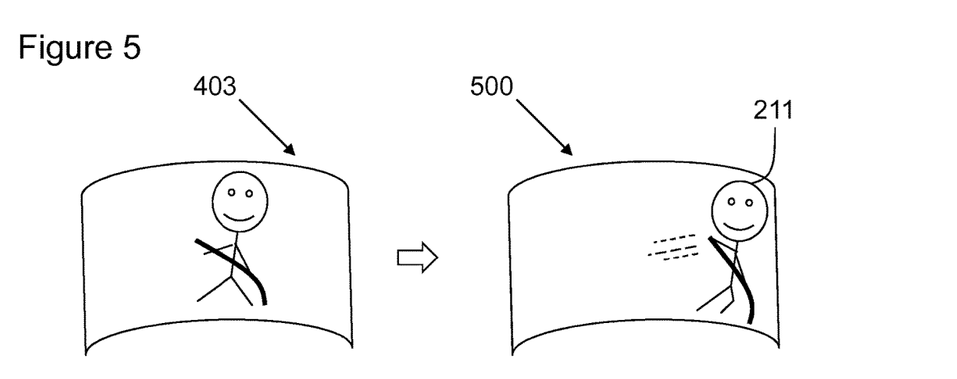
FIG. 5 illustrates continuation of the virtual reality content after display of the missed event content.

FIG. 5 shows two exemplary frames to illustrate continuation of the virtual reality content once the missed event content 400 has been provided for display. In some examples, such as for pre-recorded content or live content, the missed event content may be provided for display and then the virtual reality content may continue from the time point it was interrupted to display the missed event content. However, for live content in particular, this may mean the user is no longer watching the live content but content that is delayed (which may be buffered by the apparatus 100 or VR apparatus 101) by the length of the missed event content. Thus, FIG. 5 shows how the apparatus 100 may provide for display of the virtual reality content from a) the time point at which the virtual reality content was interrupted to display the missed event content to b) a time point at which the VR content is displayed live to the user, at an increased playback speed relative to a normal playback speed of the VR content.

Thus, FIG. 5 shows the final frame 403 of the missed event content 400 and continuation of the VR content, displayed in virtual reality, but at an increased playback speed. A frame 500 shows the player 211 skating away at increased playback speed. The virtual reality content is then provided for display to the user at its normal, e.g. real-time, playback speed once the VR content displayed to the user "catches up" with the live VR content received by the VR apparatus 101.

In order to display the appropriate visual content as part of the missed event content, the apparatus may identify the particular audio event 206 that the user 200 reacted to. This may be achieved in numerous ways.

For example, the apparatus 100 may have access to predetermined audio event data that identifies the direction and timing of audio events that occur in the VR content. Accordingly, in response to a change in the viewing direction, the apparatus 100 may, based on the audio event data, the second viewing direction and the time relative to the VR content, identify the particular audio event that the user reacted to. The audio event data, which may include the start and end times of the audio event and the direction thereof may be used to extract appropriate visual imagery from the VR content to create the missed event content.

The audio event data created manually such as in post-production of the VR content. The audio event data may be created automatically from audio analysis of the spatial audio or visual analysis of visual imagery of the VR content.

In one or more examples, the audio event data may be created from sensor data, said sensor data obtained from sensors (not shown) associated with objects that are captured in the VR content. Thus, for example, during VR content capture of an ice-hockey game a sensor, such as an acceleration sensor or sound sensor, may be placed in the puck. Accordingly, acceleration of the puck may be detected by the sensor and it can be deduced when an audio event that the user could react to may have occurred. The audio event data may be created using such in-VR-content-captured-scene sensors. The duration of the acceleration (or other sensed quantity) may be used to determine the start and end points of the audio event. The direction of the sensor relative to the content capture device 104 may be used to specify the audio event direction.

In one or more examples, the apparatus may analyse the spatial audio of the VR content to identify audio events. Such analysis may be performed to create audio event data. The analysis described herein may be performed on-the-fly. Accordingly, in response to the change in viewing direction, the apparatus may provide for audio analysis of the spatial audio having a direction, within the threshold direction, of the second direction and at least at the current time and optionally within the recent-time-threshold of the current time to identify an audio event. The audio event may be identified by audio analysis of absolute or relative volume relative to a threshold. Thus, the fact a particular part of the directional audio is louder may identify it as the particular audio event, the times at which the audio event becomes louder defining, at least in part, the start point of the missed event content. The audio event may be identified by audio analysis of frequency relative to a threshold. Thus, the occurrence of sound in a particular frequency band (e.g. a deep voice of a character) of the directional audio may identify it as the particular audio event. The times at which audio is present in the frequency band may define, at least in part, the start point of the missed event content. The audio event may be identified by audio analysis using voice recognition to identify the voice of particular characters (i.e. actors/actresses) appearing in the VR content. Thus, the fact a particular voice is part of the directional audio in approximately the second direction may identify it as the particular audio event, the times at which the voice is heard defining, at least in part, the start point of the missed event content.

In one or more examples, the apparatus may provide for video analysis the video imagery of the VR content to identify action in the video where a potential audio event may occur.

Figure 6:
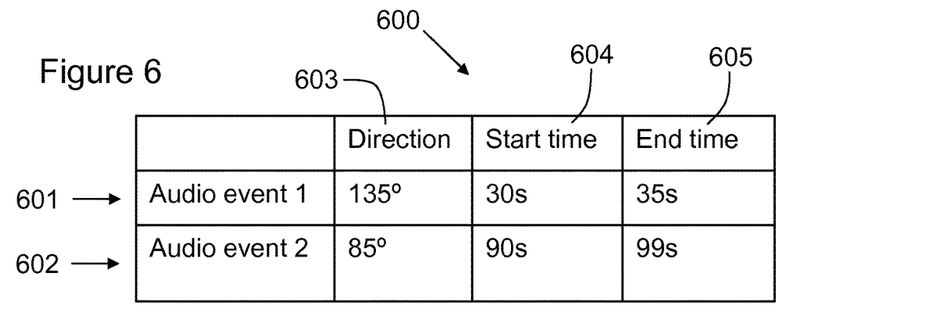
FIG. 6 illustrates example audio event data.

FIG. 6 shows an example audio event data 600. It will be appreciated that the tabular form of the audio event data 600 is for exemplification only and may be stored in any number of ways. As an example the audio event data 600 comprises two audio events 601 and 602. These audio events 601, 602 may have been determined by sensor data, such as the in-VR-content-captured-scene sensors or by audio analysis or by any of the method described herein.

For each audio event 601, 602 the audio event data 600 may include the perceived direction 603 of the audio event as it will be presented to the user 200, the start time 604 of the audio event and the end 605 time. Thus, it can be seen that "audio event 1" 601 occurs in the direction 135° and starts at a time, relative to the VR content, of 30 seconds until 35 seconds.

Accordingly, should the user 200 change the viewing direction of the VR view to 140° at approximately 32 seconds into the playback of the VR content, the apparatus may provide for, using the audio event data 600, the identification of "audio event 1" 601 as being the particular audio event. Thus, 140° may be considered to be within the direction threshold and is therefore sufficiently close to 135°. Further, 32 seconds may be determined to be during the occurrence of the "audio event 1" 601. Accordingly, the apparatus may, using the audio event data 600, determine that the missed event content should use visual imagery of the VR content from around 135° viewing direction and the temporal start point of the missed event content may be based on the start time 604 of the "audio event 1" 601. Thus, if the predetermined time period used to determine how temporally far prior to the audio event 601 to start the missed event content is 5 seconds, the start point of the missed event content may be 25 seconds into the run-time of the VR content.

Figure 7:
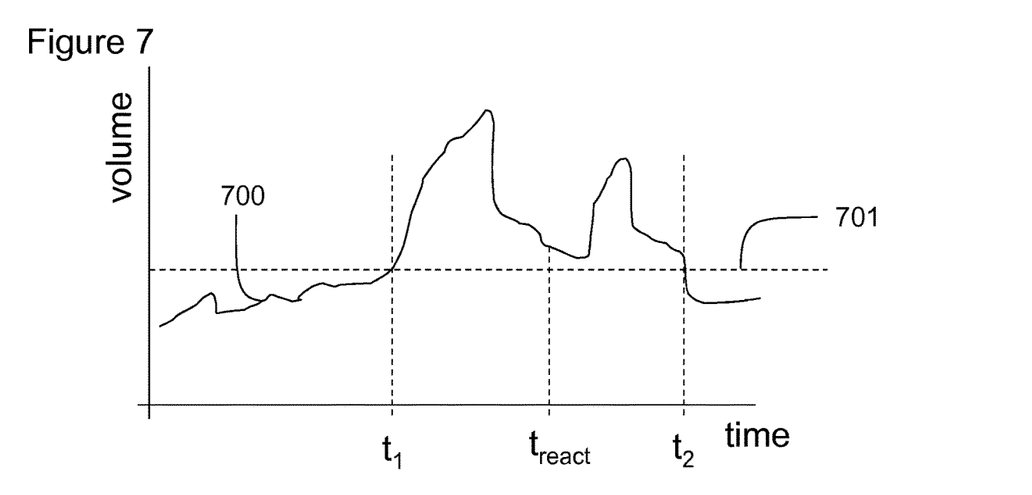
FIG. 7 illustrates an example of audio analysis.

FIG. 7 shows an example graph of a plot 700 of volume of the audio in a particular viewing direction, such as viewing direction 300, or range of viewing directions. The graph of FIG. 7 provides for illustration of audio analysis of the spatial audio. It will be appreciated that the graphical form of the audio analysis is for exemplification only and may be performed in any number of ways. In this example, the change in view direction by the user to the second direction 300 occurs at time $t_{react}$. The apparatus 100, in provision of the herein described audio analysis may identify, using a threshold 701 that an above-threshold sound occurred between times $t_1$ and times $t_2$. Accordingly, said sound may be identified as the particular audio event 206. Thus, the time point $t_1$ may be used to determine the start time of the missed event content. In one or more examples, the time $t_{react}$ may occur after time $t_2$. The apparatus may be configured to identify the audio event between times $t_1$ and $t_2$ as an audio event that occur sufficiently recently in the past to be the audio event the user reacted to.

In other examples, the plot 700 may represent a particular frequency and rather than be distinguished in terms of volume, the frequency range of a particular portion of audio may provide for its identification as a particular audio event.

The above described embodiments may advantageously use audio events to determine the start time of the missed event content. As described above the identification of and the timing of the audio event may be determined by way of one or more of:

predetermined audio event data, which in turn may be based on audio analysis, video analysis, sensor data;

audio analysis which may include volume-based, frequency-based and/or voice-recognition-based analysis; or video analysis, which may include lip reading analysis and/or action identification algorithms that look for rapidly changing localised video imagery above a threshold.

Figure 8:
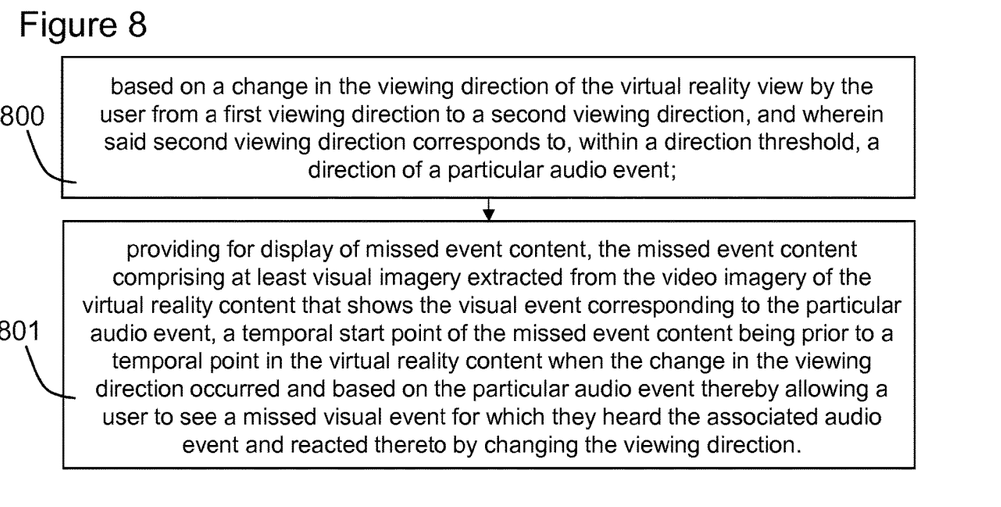
FIG. 8 shows a flowchart illustrating an example method.

FIG. 8 shows a flow diagram illustrating the steps of based on 800 a change in the viewing direction of the virtual reality view by the user from a first viewing direction to a second viewing direction, and wherein said second viewing direction corresponds to, within a direction threshold, a direction of a particular audio event; providing for 801 display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event thereby allowing a user to see a missed visual event for which they heard the associated audio event and reacted thereto by changing the viewing direction.

Figure 9:
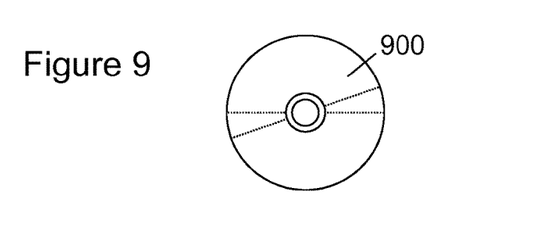
FIG. 9 shows a computer readable medium.

FIG. 9 illustrates schematically a computer/processor readable medium 900 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
   based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;
   provide for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

2. An apparatus according to claim 1, wherein the visual event related to the particular audio event was not visible in the virtual reality view when directed in the first viewing direction or, in the virtual reality view when directed in the first viewing direction, the user's gaze did not lie upon said visual event when the corresponding particular audio event occurred.

3. An apparatus according to claim 1, wherein the temporal start point of the missed event content is based on the time at which the particular audio event is deemed to have begun based on one or more of analysis of the particular audio event relative to any other audio presented or predetermined audio event data that defines at least the timing of audio events in the virtual reality content.

4. An apparatus according to claim 1, wherein the provision of the missed event content is further based on the rate of change in viewing direction between the first viewing direction and the second viewing direction exceeding a direction-change threshold.

5. An apparatus according to claim 1, wherein the provision of the missed event content is further based on one or more of the volume or frequency content of the particular audio event relative to an audio threshold.

6. An apparatus according to claim 1, wherein determination of the particular audio event is based on one or more of;
predetermined audio event data comprising the direction to one or more audio events occurring in the virtual reality content and a correlation between the second viewing direction, within the direction threshold, and the direction of one of the one or more audio events; or
audio analysis of the spatial audio in response to the change in viewing direction to identify the particular audio event the user reacted to.

7. An apparatus according to claim 1, wherein the provision of display of the missed event content includes providing for temporarily pausing of the virtual reality content and display of the missed event content in the virtual reality view.

8. An apparatus according to claim 1, wherein in response to the change in viewing direction towards the direction of the particular audio event, provide for display of the virtual reality content in reverse with respect to time such that the virtual reality content appears to the user as being re-wound to a time point at which the missed event content begins.

9. An apparatus according to claim 1, wherein the missed event content comprises one or more of;
missed event video imagery extracted from the video imagery of the virtual reality content;
missed event still imagery extracted from the video imagery of the virtual reality content;
missed event virtual reality content extracted from the video imagery of the virtual reality content wherein at least an initial viewing direction of the missed event virtual reality content is aligned with the direction of the particular audio event; or
missed event virtual reality content extracted from the video imagery of the virtual reality content wherein the missed event virtual reality content has a spatial extent less than the spatial extent of the virtual reality content and is focussed in the direction of the particular audio event.

10. An apparatus according to claim 1, wherein the missed event content is provided for display as picture in picture in the virtual reality view with the virtual reality content.

11. An apparatus according to claim 1, wherein upon completion of the display of the missed event content the display of the virtual reality content is resumed from a time point corresponding to the time of the change in viewing direction from the first viewing direction to the second viewing direction.

12. An apparatus according to claim 1, wherein upon completion of the display of the missed event content the virtual reality content is provided for display, at least temporarily, at a playback speed greater than real-time.

13. A method, the method comprising:
in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;
based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;
providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

14. A method according to claim 13, wherein the visual event related to the particular audio event was not visible in the virtual reality view when directed in the first viewing direction or, in the virtual reality view when directed in the first viewing direction, the user's gaze did not lie upon said visual event when the corresponding particular audio event occurred.

15. A method according to claim 13, wherein the temporal start point of the missed event content is based on the time at which the particular audio event is deemed to have begun based on one or more of analysis of the particular audio event relative to any other audio presented or predetermined audio event data that defines at least the timing of audio events in the virtual reality content.

16. A method according to claim 13, wherein the provision of the missed event content is further based on the rate of change in viewing direction between the first viewing direction and the second viewing direction exceeding a direction-change threshold.

17. A method according to claim 13, wherein the provision of the missed event content is further based on one or more of the volume or frequency content of the particular audio event relative to an audio threshold.

18. A method according to claim 13, wherein determination of the particular audio event is based on one or more of;
predetermined audio event data comprising the direction to one or more audio events occurring in the virtual reality content and a correlation between the second viewing direction, within the direction threshold, and the direction of one of the one or more audio events; or
audio analysis of the spatial audio in response to the change in viewing direction to identify the particular audio event the user reacted to.

19. A method according to claim 13, wherein the provision of display of the missed event content includes providing for temporarily pausing of the virtual reality content and display of the missed event content in the virtual reality view.

20. A non-transitory computer readable medium comprising program instructions stored thereon for performing at least the following:
in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space, the virtual reality content including spatial audio wherein the perceived direction to an audio event related to a visual event in the video imagery corresponds to a visual location of said visual event as presented in the virtual reality space;

based on a change in the viewing direction of the virtual reality view by the user from a first viewing direction to a second viewing direction, and wherein said second viewing direction corresponds to, within a direction threshold, a direction of a particular audio event, a start of which occurred prior to the change in the viewing direction;

providing for display of missed event content, the missed event content comprising at least visual imagery extracted from the video imagery of the virtual reality content that shows the visual event corresponding to the particular audio event, a temporal start point of the missed event content being prior to a temporal point in the virtual reality content when the change in the viewing direction occurred and based on the particular audio event.

* * * * *